(12) United States Patent
Ikeda

(10) Patent No.: US 12,300,270 B2
(45) Date of Patent: May 13, 2025

(54) MAGNETIC DISK DRIVE AND DATA CONTROL METHOD

(71) Applicants: Kabushiki Kaisha Toshiba, Tokyo (JP); Toshiba Electronic Devices & Storage Corporation, Tokyo (JP)

(72) Inventor: Naomichi Ikeda, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/521,329

(22) Filed: Nov. 28, 2023

(65) Prior Publication Data

US 2025/0054517 A1 Feb. 13, 2025

(30) Foreign Application Priority Data

Aug. 10, 2023 (JP) ................................. 2023-130849

(51) Int. Cl.
*G11B 20/12* (2006.01)

(52) U.S. Cl.
CPC .. *G11B 20/1217* (2013.01); *G11B 2020/1225* (2013.01); *G11B 2020/1238* (2013.01)

(58) Field of Classification Search
CPC ............ G11B 5/59633; G11B 5/59655; G11B 5/59688; G11B 5/54; G11B 20/1426; G11B 20/1411; G11B 27/3027; G11B 2220/90; G11B 5/012; G11B 27/34; G11B 20/1217
USPC ......................................................... 360/48
See application file for complete search history.

(56) References Cited

U.S. PATENT DOCUMENTS 9,448,738 B2 9/2016 Horn
9,601,142 B1 * 3/2017 Jury .................. G11B 20/1217
2017/0124104 A1 5/2017 Smith et al.

* cited by examiner

*Primary Examiner* — Nabil Z Hindi
(74) *Attorney, Agent, or Firm* — Kim & Stewart LLP

(57) ABSTRACT

According to one embodiment, a magnetic disk drive of shingled magnetic recording (SMR), wherein user data is written to a disk with a header such as a preamble attached thereto, for each data frame including a plurality of blocks, which is a data area in a track of the disk to which the user data is written.

11 Claims, 7 Drawing Sheets

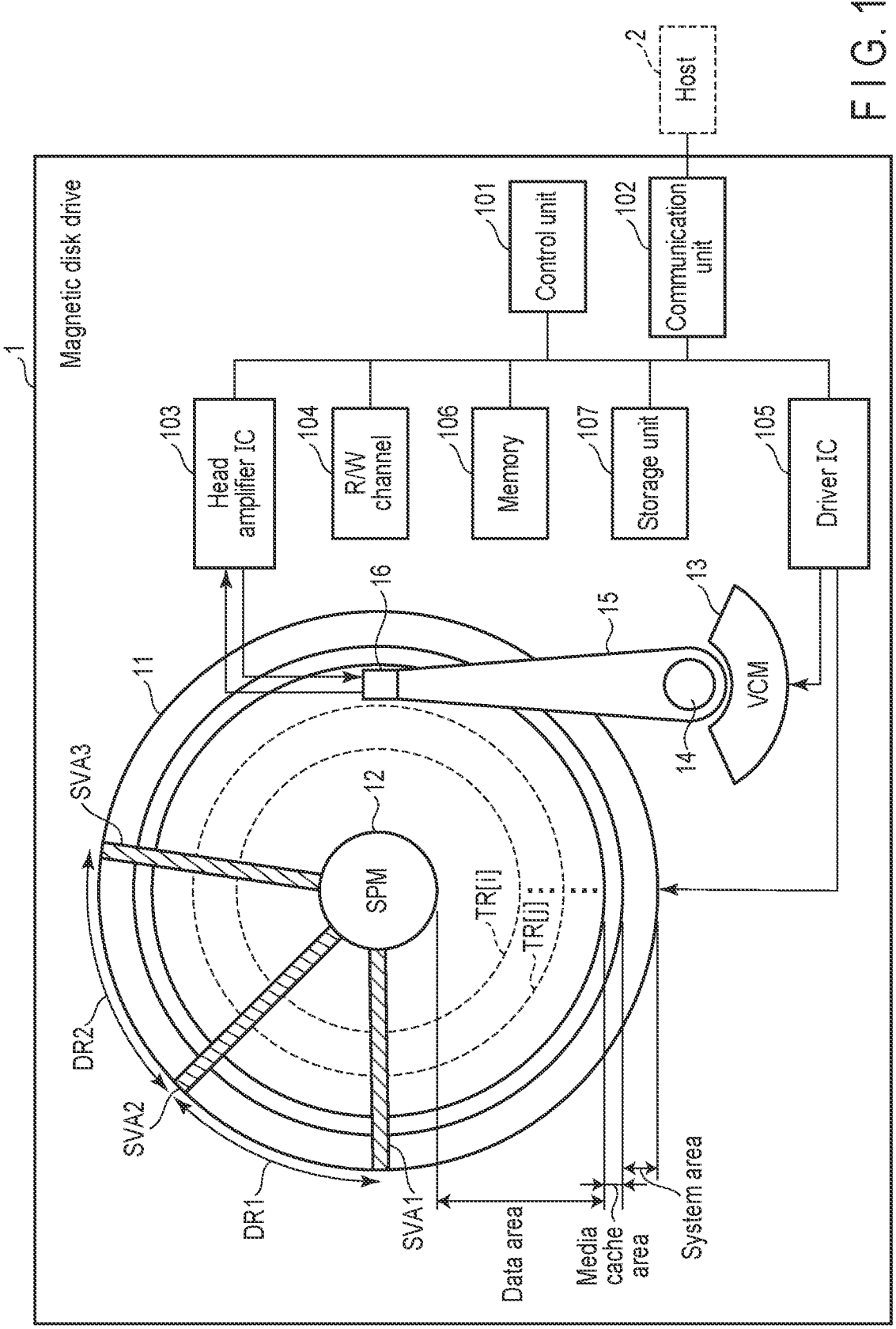
F I G. 1

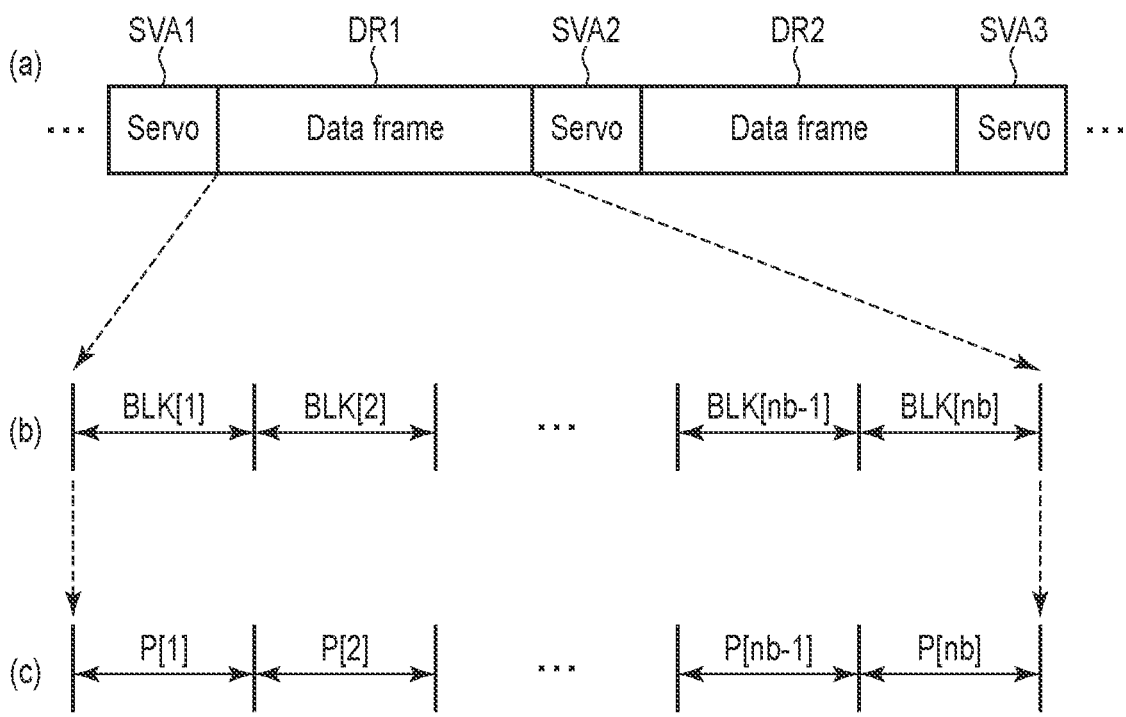
F I G. 2

| Track | U-Sct 2-1 | Servo | U-Sct 2-2 | U-Sct 3-1 | Servo | U-Sct 3-2 | U-Sct 4-1 | Servo | U-Sct 4-2 | U-Sct5 | Servo |
|---|---|---|---|---|---|---|---|---|---|---|---|
| U-Sct1 | | | | | | | | | | | |
| U-Sct6 | U-Sct 7-1 | Servo | U-Sct 7-2 | U-Sct 8-1 | Servo | U-Sct 8-2 | U-Sct 9-1 | Servo | U-Sct 9-2 | U-Sct10 | Servo |
| U-Sct11 | U-Sct 12-1 | Servo | U-Sct 12-2 | U-Sct 13-1 | Servo | U-Sct 13-2 | U-Sct 14-1 | Servo | U-Sct 14-2 | U-Sct15 | Servo |

TR[1]
TR[2]
TR[3]

F I G. 5A

| Sct1 | Servo | Sct2 | Servo | Sct3 | Servo | Sc4 | Servo |
|---|---|---|---|---|---|---|---|
| Sct5 | Servo | Sct6 | Servo | Sct7 | Servo | Sc8 | Servo |
| Sct9 | Servo | Sct10 | Servo | Sct11 | Servo | Sc12 | Servo |

TR[1]
TR[2]
TR[3]

F I G. 5B

| Track | Sector allocation for user specified sector size | Sector allocation when sector size is data frame length |
|---|---|---|
| 1 | U-Sct1~U-Sct5 | Sct1~Sct4 |
| 2 | U-Sct6~U-Sct10 | Sct5~Sct8 |
| 3 | U-Sct11~U-Sct15 | Sct9~Sct12 |

F I G. 5C

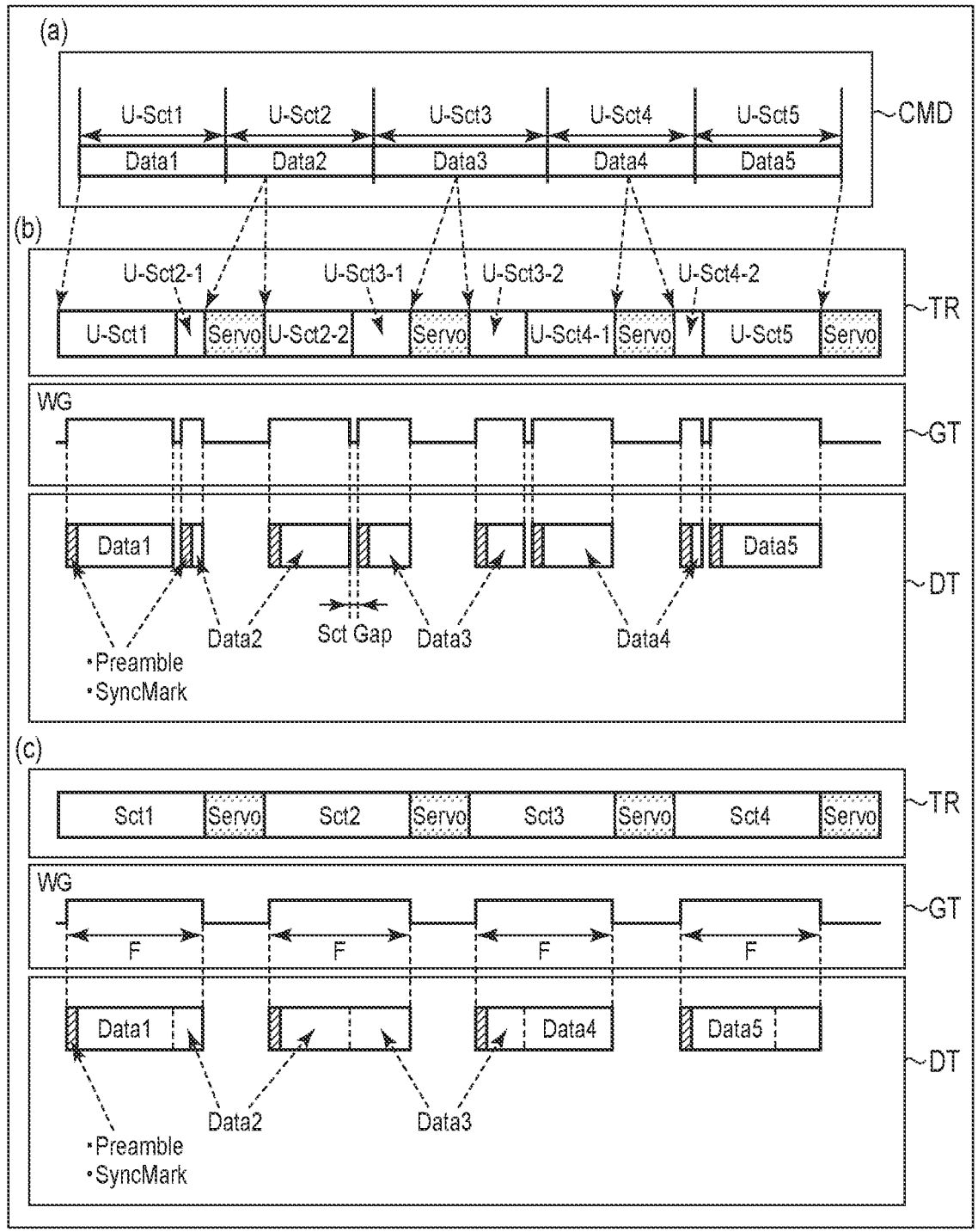
F I G. 6

MAGNETIC DISK DRIVE AND DATA CONTROL METHOD

CROSS-REFERENCE TO RELATED APPLICATIONS

This application is based upon and claims the benefit of priority from Japanese Patent Application No. 2023-130849, filed Aug. 10, 2023, the entire contents of which are incorporated herein by reference.

FIELD

Embodiments described herein relate generally to a magnetic disk drive using shingled magnetic recording (SMR) and a data control method.

BACKGROUND

Magnetic disk drives using shingled magnetic recording (SMR) improve in its disk capacity by overlapping adjacent tracks. When data is written to a track in the SMR, however, the SMR requires a process of writing all data of tracks in the same band, a process of storing data of tracks temporarily in a cache area, and the like.

If data in the tracks is operated by the temporal storage process, data storage efficiency is further improved.

Embodiments described herein aim to provide a magnetic disk drive and a data control method in which a format for writing data to a magnetic disk is changed.

BRIEF DESCRIPTION OF THE DRAWINGS

FIG. 1 is a configuration block diagram of a magnetic disk drive according to a first embodiment.

FIG. 2 shows schematic diagram examples of data structure of a track in a magnetic disk of the magnetic disk drive according to the first embodiment.

FIGS. 5A, 5B and 5C show examples of a management table indicating the relationship between user-specified sectors and sectors when the magnetic disk drive according to the first embodiment receives a write command.

FIG. 6 shows the relationship between various sectors and various data items when the magnetic disk drive according to the first embodiment receives a write command.

DETAILED DESCRIPTION

Figure 3:
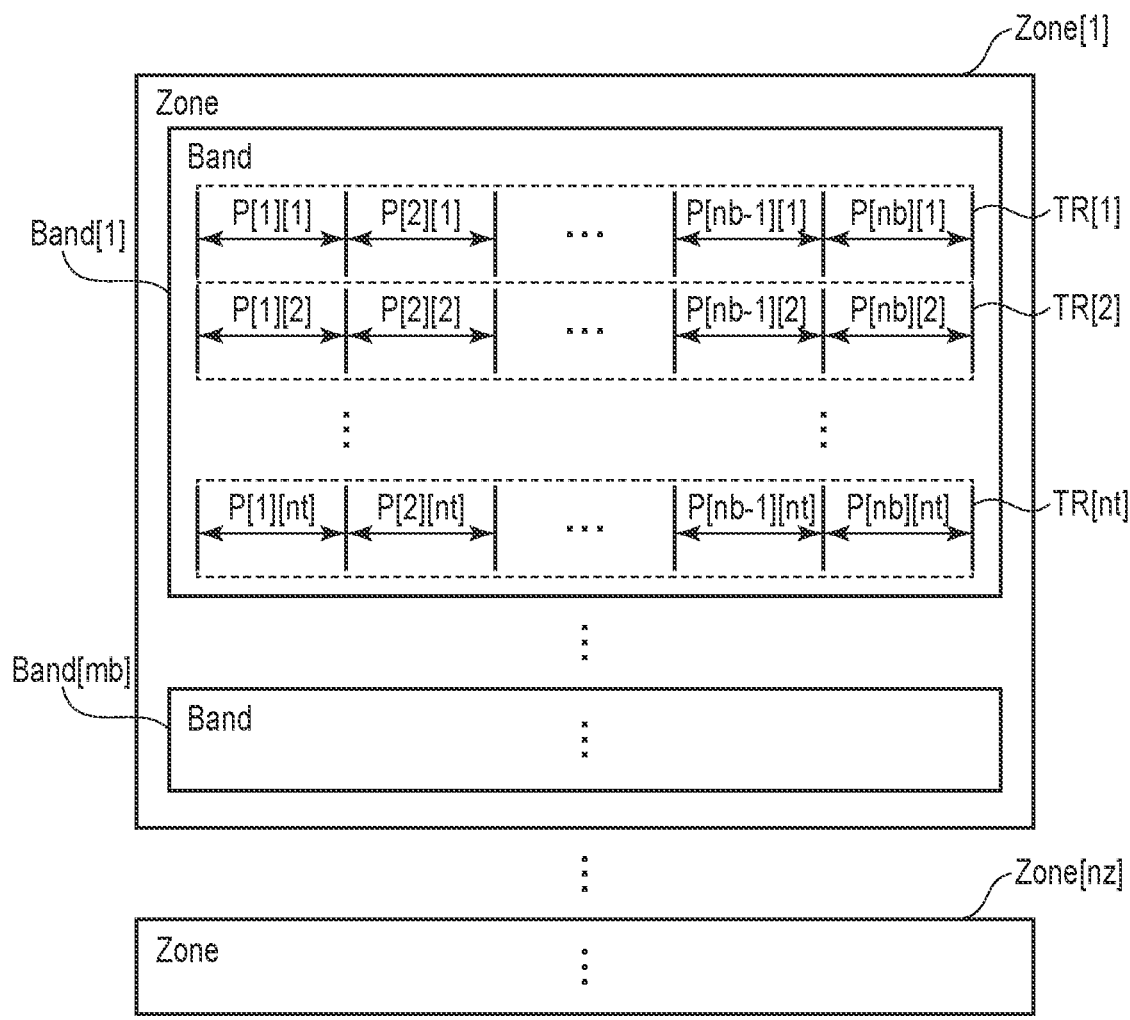
FIG. 3 is a schematic diagram showing an example of data structure of a magnetic disk of the magnetic disk drive according to the first embodiment.

Hereinafter, embodiments will be explained with reference to the accompanying drawings. Note that, the figures indicate merely examples, and the scope of the invention is not limited thereby.

In general, according to one embodiment, a magnetic disk drive of shingled magnetic recording (SMR), wherein user data is written to a disk with a header such as a preamble attached thereto, for each data frame including a plurality of blocks, which is a data area in a track of the disk to which the user data is written.

First Embodiment

The first embodiment is directed to an example of a magnetic disk drive in which data of a user-specified sector specified as a write command received from a host is format-converted and written to a disk.

FIG. 1 is a functional block diagram of the magnetic disk drive according to the first embodiment.

The magnetic disk drive 1 is an SMR storage device including a magnetic disk 11 to and from which data is written and read (which may be referred to simply as a disk 11). The magnetic disk drive 1 includes a processing device such as a microprocessor having a computer function such as arithmetic computation. The magnetic disk drive 1 outputs data to a host system 2 connected thereto and writes data to the disk 11 from the host system 2, based on commands received from the host system 2.

The disk 11 is a disk-shaped magnetic rotating disk storage medium and has a data area which is data-writable, in which, a user available user data area, a system area to which information necessary for system management is written, a media cache area capable of temporarily storing various types of data and the like are allocated. Hereinafter, the direction orthogonal to the radial direction of the disk 11 will be referred to as a circumferential direction. The disk 11 is attached to a spindle 12 and rotated by driving the spindle 12.

In the disk 11, a plurality of tracks are set in the data area concentrically around a spindle 12. In FIG. 1, the tracks are shown as TR[i] and TR[j] (i and j represent the number of an optional track and will be referred to as TR unless otherwise distinguished). When data is written to or read from the disk 11, a head 16 is moved to the track TR to be read and written by seek control, tracking control and the like, and the head 16 receives a read signal from the track TR and outputs a write signal thereto. In particular, data on the disk 11 will be referred to as disk data, data instructed to be read from the disk 11 will be referred to as read data, and data instructed to be written to the disk 11 will be referred to as write data.

Servo information is written to the disk 11 and used, for example, to detect the position of the head 16. The servo information is set in a predetermined position (referred to as a servo area) in the circumferential direction of the disk 11. Since the servo information is a commonly used term, its detailed description will be omitted. As examples of the servo area, FIG. 1 shows three servo areas SVA1, SVA2 and SVA3 (which will be referred to as servo areas SVA unless otherwise distinguished). In general, the servo areas SVA are arranged at equal intervals along the entire circumferential direction of the disk 11, and servo information is written to the servo areas SVA of each track TR. The magnetic disk drive 1 can detect the current position of the head 16 based on the servo information read by the head 16.

Between the servo areas SVA of the disk 11, there is an area where data such as user data is stored, which is called a data frame.

The spindle 12 is a support of the disk 11 and is placed in, for example, the housing of the magnetic disk drive 1. As the spindle 12 rotates, the disk 11 rotates.

The VCM 13 is a voice coil motor actuator used to move an arm 15 and the like. The VCM 13 controls the operation of the arm 15 and the like based on the current input thereto. Note that the VCM 13 in the first embodiment is not limited to a voice coil motor actuator.

The pivot 14 is a bearing for supporting the arm 15 and the like to rotate them and the like.

The arm 15 supports the head 16 and transmits power from the VCM 13 to the head 16 to move the head 16 to a target track TR.

The head 16 is a unit that writes data to the disk 11 and reads data from data tracks of the disk 11. In particular, a head that writes data to the disk 11 and a head that reads data from the data tracks of the disk 11 are distinguished from each other, and the former will be referred to as a write head 16W and the latter will be read to as a read head 16R.

The control unit 101 is a hard disk controller that receives a command or the like from the host 2 to control each unit of the magnetic disk drive 1 based on the received command or the like. The control unit 101 may be configured by a CPU, a processing device such as a microprocessor, hardware such as an IC chip including other processing devices, or the like, or may be executed by software programs (including firmware) or may be provided as hardware or a combination of software and hardware. The control unit 101 receives from the host 2 commands such as an instruction to write data to the disk 11 and an instruction to read data from the disk 11.

The various processes of the control unit 101 may be executed by software programs (including firmware and the like) or may be provided as hardware or software or a combination thereof.

The communication unit 102 is connected to a cable and the like to exchange data with the host 2.

The head amplifier IC 103 includes, for example, a read amplifier and a write driver. The read amplifier amplifies a signal read from the disk 11 and outputs the read signal to an R/W channel 104. The write driver supplies the head 16 with a write current corresponding to the signal output from the R/W channel 104.

The R/W channel 104 controls the head amplifier IC 103 to read data from the disk 11 and write data to the disk 11 in response to instructions from the control unit 101 or the like. The R/W channel 104 receives a read signal from the head amplifier IC 103 and extracts data (read data) from the disk 11. The R/W channel 104 also generates a write data signal based on data (write data) or the like and outputs the signal to the head amplifier IC 103. The R/W channel 104 extracts servo information from the read signal received from the head amplifier IC 103.

The driver IC 105 outputs a current or voltage to drive and control the SPM 12, VCM 13 and the like in the control of the control unit 101 and the like.

The memory 106 is a semiconductor memory, in which data is lost when power supply is cut off, and may be used as a work memory for the control unit 101. The memory 106 is, for example, a dynamic random access memory (DRAM) or a synchronous dynamic random access memory (SDRAM). The memory 106 may include a buffer area that temporarily storing, for example, commands received by the magnetic disk drive 1 from the host system 2.

The storage unit 107 is a semiconductor memory that records data that is stored even if power supply is cut off. The storage unit 107 stores data, programs and the like, which are necessary to operate the magnetic disk drive 1, such as a sector management table. The storage unit 107 is, for example, a NOR or NAND flash read only memory (FROM).

The host 2 is, for example, a personal computer body and is connected to the magnetic disk drive 1. For example, the host 2 outputs data read/write commands and write data to the magnetic disk drive 1, and receives read data from the magnetic disk drive 1.

FIG. 2 shows schematic diagram examples of data structure of a track in the magnetic disk of the magnetic disk drive according to the first embodiment.

FIG. 2(a) shows an example of the frame format of a track, in which the servo areas SVA and data frames DR that are data areas, which are shown in FIG. 1, are alternately allocated. FIG. 2(b) shows an example, in which one data frame DR1 is further divided into nb blocks, and each of the nb blocks is called a sector (also called a physical address). Each sector is allocated a logical address called a logical block address (LBA). The host 2 uses the LBA to create and transmit commands to the magnetic disk drive 1. FIG. 2(c) shows a physical address on the magnetic disk 11 corresponding to the LBA.

FIG. 3 is a schematic diagram showing an example of data structure of the magnetic disk of the magnetic disk drive according to the first embodiment.

Since the magnetic disk drive 1 adopts the SMR, adjacent tracks on the disk 11 are overlapped. Assume that data is written to track TR[1], for example. If data already exists on track TR[2] adjacent to track TR[1] in the forward direction (in the central direction of the disk 11), the data needs to be rewritten. If, therefore, data is written to track TR[1] in the SMR, it is necessary to perform operations such as backing up the data of track TR[2] by copying it to the media cache area of the disk 11 temporarily, and then writing the data to track TR[1]. Similarly, if data is written to track TR[2], it is necessary to perform operations such as writing data of adjacent track TR[3] in the forward direction again in the same manner.

If, therefore, data is written to track TR[1], for example, it is necessary to perform operations such as continuing to write data again up to the track having no adjacent track in the forward direction (corresponding to track TR[nt] in FIG. 3). The set of tracks adjacent to tracks TR[1] to TR[nt] is referred to as a band (corresponding to Band[1] in FIG. 3). In addition, a plurality of bands can be assumed on the disk 11, and the set of bands is referred to as a zone. In FIG. 3, a plurality of bands are shown as Band[identification number of the BAND]. Since, for example, a guard band is provided between adjacent bands, if data is written to Band[1], the effect on its adjacent Band[2] in the forward direction need not be considered. Hereinafter, writing to the disc 11 in units of bands will be referred to as Band write.

In addition, a plurality of zones can be assumed on the disk 11. In FIG. 3, a plurality of zones are shown as Zone[identification number of the Zone). FIG. 3 shows an example with nz zones on the disk 11 and mb bands in Zone[1]. FIG. 3 also shows an example with nb physical addresses (nb blocks) in each track TR, and the physical addresses are indicated as P[sector identification number][track identification number]. In FIG. 3, Band[1] includes nb×nt physical addresses (nb×nt blocks). The number of blocks nb of one track can be set to a different value for each zone, band or track. In addition, the number of tracks nt in one band can be set to a different value for each zone or band. The number of bands mb in one zone can be set to a different value for each zone.

An example of processing of the magnetic disk drive according to the first embodiment will be described below.

The SMR magnetic disk drive 1 executed the Band write based on a command transmitted from the host 2, for example. The command contains the address of the first block to which data is written (which may also be referred to as the first LBA) and the number of blocks. A sector in the area specified by the address of the first block and the number of blocks is referred to as a user-specified sector.

Note that the size of the user-specified sector is referred to as a user-specified sector size (which may also be referred to as a user-specified block size). The user-specified sector size is the smallest unit of data that can be specified by a user at the time of data operation. The user-specified sector size is not included in the command issued during the operation. Usually, it is set during shipment and its setting can be changed from, for example, the host 2 intentionally by the user.

The user-specified sector size may differ from the data frame length shown in FIG. 2 (data area sector on the disk 11). When write data is written to the disk 11, the firmware (referred to as FW) of the control unit 101 of the first embodiment divides or connects data of the user-specified sector size, or the like to match the data frame length of the disk 11 and then convert the format of the data and write the data to the disk 11.

The data frame length may be changed with a change in zone or the like when data is written to the disk 11 by the Band write. The control unit 101 follows the change in the data frame length, changes the write format (the number of bits, etc.) of the received data to match the changed data frame length, and writes the data.

Figure 4:
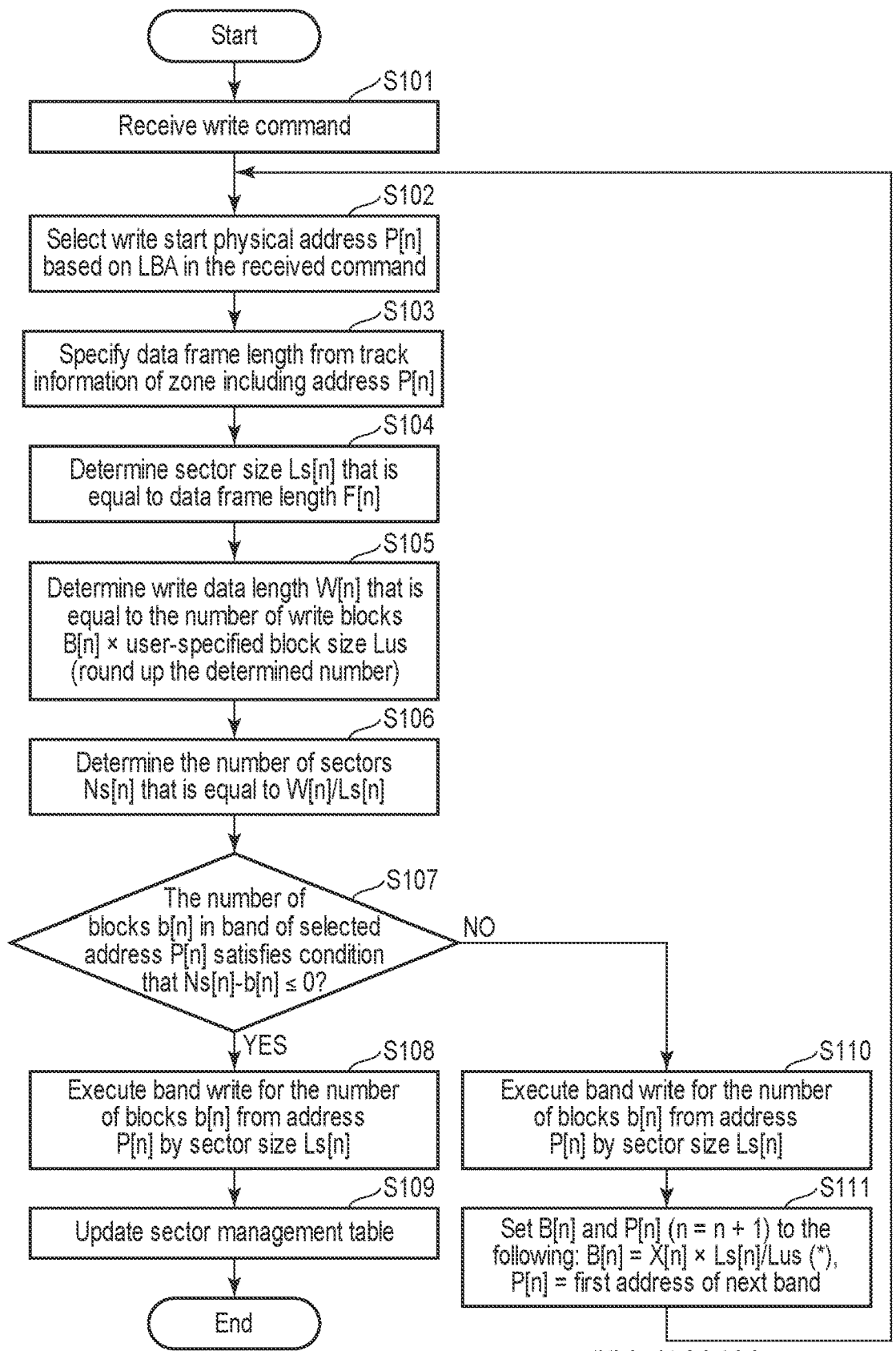
FIG. 4 is a flowchart showing a process to be performed when the magnetic disk drive according to the first embodiment receives a write command.

FIG. 4 is a flowchart showing a process to be performed when the magnetic disk drive according to the first embodiment receives a write command.

The FW of the control unit 101 receives a write command including a write start LBA and the number of write blocks (step S101). The control unit 101 selects a write start physical address $P[n]$ corresponding to the write start LBA as a physical address to start a write process (step S102). Assume that the address P (n) is in band Band(n). The control unit 101 specifies a data frame length $F[n]$ from track information of a zone including the address $P[n]$ (step S103).

The control unit 101 determines the converted sector size (the number of bits) $Ls[n]$ for writing data to the disk 11 as $Ls[n]=F[n]$ so that the size is equal to the data frame length $F[n]$ (step S104). The control unit 101 determines a write data length $W[n]$ as the product of the number of write blocks $B[n]$ included in the received command and the user-specified sector size Lus, wherein $W[n]$ is equal to $B[n] \times Lus$ (step S105). $B[n]$ represents the number of write blocks included in the band Band[n].

The control unit 101 divides the write data length $W[n]$ by the sector size $Ls[n]$ to determine the number of converted sectors $Ns[n]$ as being equal to $W[n]/Ls[n]$ (step S106). In step S106, the number of $W[n]/Ls[n]$ is, for example, rounded up. The write data length $W[n]$ represents the length of write data included in the band Band[n].

The control unit 101 starts to write data for the number of sectors $Ns[n]$ from the address $P[n]$ to check whether the data falls within the band Band[n] (step S107). In step S107, for example, the number of blocks from $P[n]$ to the end of band Band[n] is $b[n]$, and the control unit 101 checks whether the condition that $Ns[n]-b[n]$ is equal to and smaller than 0 is satisfied. If the condition is satisfied in step S107 (Yes in step S107), the control unit 101 executes band write for the number of blocks $b[n]$ from address $P[n]$ by the sector size $Ls[n]$ (step S108).

On the other hand, if the condition is not satisfied in step S107 (No in step S107), the control unit 101 also executes band write for the number of blocks $b[n]$ from address $P[n]$ by the sector size $Ls[n]$ (step S110), selects the next band Band[n+1], and writes the remaining data to the Band[n+1] (step S111). In step S111, the control unit 101 sets $B[n]$ and $P[n]$ wherein $n=n+1$, $B[n]=(Ns[n]-b[n]) \times Ls[n]/Lus$, and $P[n]$=the first address of the next band. Thereafter, the control unit 101 repeats the process from step S102 until the write of data for the write data length $W[n]$ is completed, and terminates the write of write data to the magnetic disk 11 by the received command.

With the above process, when the magnetic disk drive 1 receives, for example, a third command including an instruction to write third user data, it selects a third data frame DR3 of a data-writable second band Band[j], if not all the third user data is written to a first band Band[i]. The value of i, j indicate the identification number of the band, respectively. Thereafter, the magnetic disk drive 1 writes at least part of the third user data to the third data frame DR3 if the third data frame DR3 includes a header. If the third data frame DR3 includes no header, the magnetic disk drive 1 attaches a header to the third data frame DR3 and writes it to at least part of the third user data. Note that the first embodiment is directed to an example in which the data frame length of the data frame DR is assumed to be changed for each band, but even if the data frame length is changed for each zone, the process has only to be performed in the same manner as in the flowchart of FIG. 4.

When the magnetic disk drive 1 receives, for example, a fourth command including an instruction to write fourth user data, it selects a fourth data frame DR4 of a data-writable second zone Zone[j], if not all the fourth user data is written to a first zone Zone[i]. The value of i, j indicate the identification number of the zone. Thereafter, the magnetic disk drive 1 writes at least part of the fourth user data to the fourth data frame DR4 if the fourth data frame DR4 includes a header. If the fourth data frame DR4 includes no header, the magnetic disk drive 1 attaches a header to the fourth data frame DR4 and writes it to at least part of the fourth user data.

Upon completing writing the write data to the magnetic disk 11 in response to the received command, the control unit 101 updates the sector management table (step S109). The sector management table indicates, for example, the correspondence between the user-specified sectors and the sectors (data frames) written to the disk 11, and stores them in the storage unit 107, the system area on the magnetic disk 11, and the like.

In the first embodiment, data is not written to the disk 11 as it is by the user-specified sector size, but the write sector size, which is the unit of writing data to the disk 11, is set as the data frame length of the disk 11. That is, the control unit 101 writes data constructed in the format of the user-specified sector size by converting the address of the data in a format based on the data frame length of the disk 11. For example, the control unit 101 performs address management by dividing or connecting the user-specified sectors defined by the user-specified sector size to match the data frame length and changing the address to one converted by the sector size whose bit number is changed.

When data is read as described above, the correspondence between the user-specified sectors sent by the host 2 and the addresses on the disk 11 to which data is written is required.

FIGS. 5A, 5B and 5C show examples of a management table indicating the relationship between user-specified sectors and sectors when the magnetic disk drive according to the first embodiment receives a write command.

The write and read commands issued from the host 2 specify the destinations of data to be written and read by the block length (user-specified sector size) set as the LBA of the first block and the number of blocks.

FIG. 5A shows an example in which the unit of writing data to the disk is defined as the unit of user-specified sectors specified as the commands received from the host 2. The example corresponds to an example of writing data by a conventional magnetic disk drive.

FIG. 5B shows an example in which the unit of writing data to the disk 11 in the first embodiment is defined as the unit of data frames. If data is written to a track at the first end of a band for the first time (if writing has no effect on the other tracks) in the first embodiment, the write may be performed in accordance with the example of FIG. 5A, and if the next write has any effect on the other tracks, the write may be performed using the method of the first embodiment indicated in FIG. 5B.

FIG. 5C shows an example of a sector management table indicating the correspondence between user-specified sectors specified as the commands received from the host 2 and sectors written to the disk 11 (data frame units). For example, data from user-specified sector sizes U-Sct1 to U-Sct5 shown in FIG. 5A is written to data frames Sct1 to Sct4 shown in FIG. 5B. The sector management table may be stored in the system area of the disk 11, the memory 106 and the like. For example, the sector management table may indicate a correspondence between user-specified sectors to which user data is written (including the LBA of the first block and the number of blocks) included in the write commands received from the host 2 and the identification numbers (which may also be referred to as sector numbers) of the data frames on the disk 11 to which user data is written.

FIG. 6 shows the relationship between various sectors and various data items when the magnetic disk drive according to the first embodiment receives a write command.

FIG. 6(a) is a schematic diagram showing a state in which user-specified sector size U-Sct, which is included in the command received from the host 2, and its corresponding write data are temporarily stored in a cache such as the memory 106. In FIG. 6(a), U-Sct and Data with the same number are paired. For example, the pair means that data Data1 is written by its corresponding user-specified sector size U-Sct1 and data Data3 is written by its corresponding user-specified sector size U-Sct3. In the first embodiment, write and read instructions are given to their respective pairs of U-Sct and Data by separate commands, but five pairs of U-Sct and Data may be specified by a single command.

FIG. 6(b) shows the state of data storage in the sector and data areas on the disk 11 when Band write is executed by a user-specified sector size such as 4kn and 512e as in the conventional SMR system or CMR magnetic disk drive (referred to as a conventional system).

As shown in FIG. 6(b), the track TR is divided into servo and data areas. In the conventional system, however, Band write is executed in the data areas by the user-specified sector size; thus, data may be written across the servo areas by, for example, U-Sct2, U-Sct3 and U-Sct4. GT represents a write gate GT that is data write timing (ON/OFF). If data in different user-specified sectors are written to the same data frame as indicated by the write gate GT, a blank period (sector gap) such as a process delay occurs between different user-specified sectors.

Data DT indicates the status of the data written to the data frames on the disk 11. As Data DT indicates, the data of each user-specified sector is stored in a data frame with a header such as Preamble and SyncMark. In a conventional magnetic disk drive, there are consecutive sectors with no servos therebetween and split sectors at a high rate, which decreases format efficiency. The format efficiency also decreases if the amount of data to be stored in the data frames (write sectors of the disk 11) varies with a difference in head, a difference in bit per inch (BPI) depending on, for example, the positions of zone or tracks on the disk 11, or the like.

FIG. 6(c) shows the state of data storage in the sector and data areas on the disk 11 when the Band write according to the first embodiment is executed.

As track TR indicates, in the Band write according to the first embodiment, the user-specified sector size U-Sct is converted into the size of the sector area of the disk 11 (equivalent to the data frame length), and data is written by the size of the sector area. Thus, as gate GT indicates, no sector gap is caused between different user-specified sectors. That is, as Data DT indicates, no gap is caused in the data frames of the disk 11 by connecting or separating different user-specified sectors in advance. For example, the data frame (Sct1) of the disk 11 contains all of Data1 and part of Data2. The rest of Data2 is written to the next data frame, Sct2, together with part of Data3. In the first embodiment, data can be written to the disk 11 as shown in FIG. 6(c) by converting the sector size of write to the disk 11 into the data frame length in accordance with the flowchart of FIG. 4.

As data DT indicates, in the first embodiment, a header such as Preamble and SyncMark is attached to data in units of data frame length to store the data in the data frame. Thus, the overhead caused by the header such as Preamble and SyncMark becomes less than in the conventional system shown in FIG. 6(b).

That is, the magnetic disk drive 1 writes the user data to the disk 11 with a header such as a preamble for each data frame. In addition, if the magnetic disk drive 1 receives, for example, a first command to write first user data to a first data frame and then receives a second command when the first data frame has free space to write user data to the first data frame, it may perform the following process.

That is, upon receiving, for example, a second command to write second user data, the magnetic disk drive 1 writes second user data from a physical address subsequent to the last physical address of the first user data written to the first data frame. On the other hand, when not all the second user data can be written to the first data frame, the rest of the second user data is written to a writable area of the second data frame if a writable second data frame has a head. If the second data frame has no header, the rest of the second user data is written to the writable area of the second data frame after the header is written.

According to the first embodiment, since the user-specified sectors are separated or connected so that the data frame length and the sector size are the same, there is no data in headers such as Preamble and SyncMark by continuous sectors having no servos therebetween, and no format loss such as a sector gap by split sectors. Therefore, the area on the medium can be used without waste. In the first embodiment, furthermore, data can be stored in a data frame format corresponding to a difference in data frame length among tracks, bands and zones.

Second Embodiment

The second embodiment is directed to an example in which the host 2 reads data which is written to the disk 11 in the first embodiment. In data read, data of up to a sector including data of the specified data length specified from host 2, and only necessary data is extracted and then output to the host 2.

Figure 7:
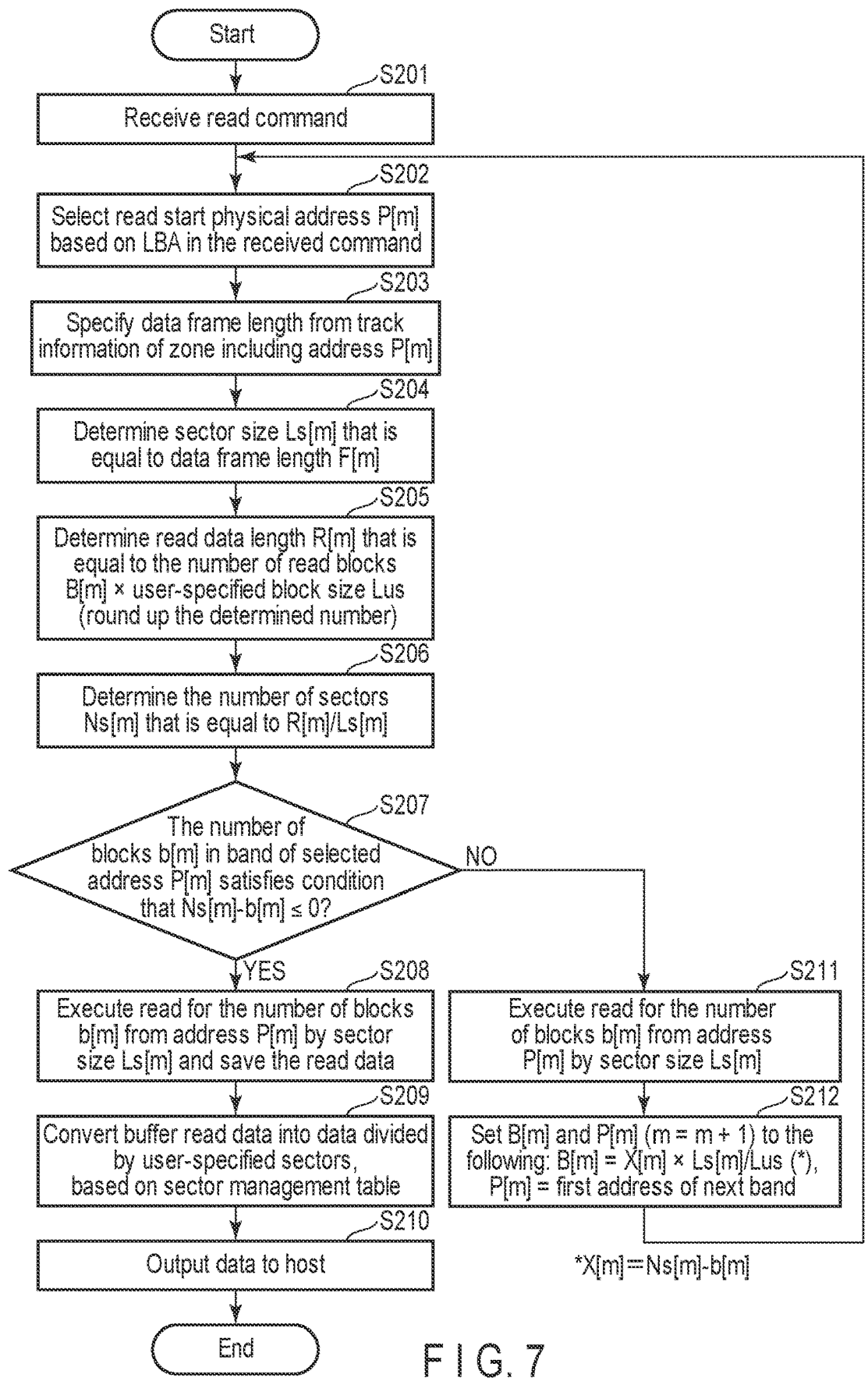
FIG. 7 is a flowchart showing a process to be performed when a magnetic disk drive according to a second embodiment receives a read command.

FIG. 7 is a flowchart showing a process to be performed when a magnetic disk drive according to the second embodiment receives a read command.

The FW of the control unit 101 receives a read command including a read start LBA and the number of read blocks (step S201). The control unit 101 selects a read start physical address P[m] corresponding to the read start LBA as a physical address to start a read process (step S202). Assume that the address P[m] is in band Band[m]. The control unit 101 specifies a data frame length F[m] from track information of a zone including the address P[m] (step S203).

The control unit 101 determines the converted sector size (the number of bits) Ls[m] for reading data from the disk 11 as Ls[m]=F[m] so that the size is equal to the data frame length F[m] (step S204). Ls[m] represents the sector size of the disk 11 from which the magnetic disk drive 1 read data. The control unit 101 determines a read data length R [m] as the product of the number of read blocks B[m] included in the received command and the user-specified sector size Lus, wherein R [m] is equal to B[m]×Lus (step S205). B[m] represents the number of read blocks which of some or all are included in the band Band[m].

The control unit 101 divides the read data length R [m] by the sector size Ls[m] to determine the number of converted sectors Ns[m] as being equal to R [m]/Ls[m] (step S206). In step S206, the number of R [m]/Ls[m] is, for example, rounded up. The read data length R [m] represents the length of read data included in the band Band[m].

The control unit 101 starts to read data for the number of sectors Ns[m] from the address P[m] to check whether all the data is completely read in the band Band[m] (step S207). In step S207, if the number of blocks from P[m] to the end of band Band[m] is b[m], the control unit 101 checks whether the condition that Ns[m]−b[m] is equal to and smaller than 0 is satisfied. If the condition is satisfied in step S207 (Yes in step S207), the control unit 101 executes read for the number of blocks b[m] from address P[m] by the sector size Ls[m] (step S208). In step S208, the control unit 101 stores the read data in a buffer such as a memory 106.

On the other hand, if the condition is not satisfied in step S207 (No in step S207), the control unit 101 also executes the read for the number of blocks b[m] from address P[m] by the sector size Ls[m] and causes the read data to be stored in a buffer such as the memory 106 (step S211). After that, the control unit 101 selects the next band Band[m+1], and reads the remaining data from the Band[m+1] (step S212).

In step S212, the control unit 101 sets B[m] and P[m] wherein m=m+1, B[m]=(Ns[m]−b[m])×Ls[m]/Lus, and P[m]=the first address of the next band. After that, the control unit 101 repeats the process from step S202 until the read of data for the read data length R [m] is completed, and terminates the read of read data from the magnetic disk 11 by the received command. That is, the control unit 10 repeats reading data and storing the data in the buffer while switching bands until the number of sectors Ns[m] reaches the total number of blocks b[m] within the band containing the start address P[m].

When the control unit 101 reads all the data specified by the command through the foregoing process, it converts the size of the read data stored in the buffer of the memory 106 into the user-specified sector size and outputs it to the host 2. The read data (data stored in the memory 106) is configured by the format shown in FIG. 5B. Therefore, in order to output the read data to the host 2, its format needs to be converted into the format in which the data was written from the host 2 (which is equivalent to the format shown in FIG. 5A).

When the control unit 101 completes reading read data into the memory 106, it converts the format of the read data based on the sector management table (step S209). More specifically, the control unit 101 acquires the sector management table (shown in FIG. 5C for example) created at the time of data writing in step S108 of FIG. 4, and converts the format of the data, which is stored in the memory 106 in the format shown in FIG. 5B, into the format of the host 2 (format shown in FIG. 5A) based on the correspondence in the sector management table.

When the control unit 101 completes the conversion into the format of the host 2, it outputs the converted data to the host 2 (step S210). In step S210, the magnetic disk drive 1 reads data up to the sector including the user-specified sector specified by the read command, extracts only necessary data (data with the header removed) and reports it to the host 2.

The foregoing process allows the host 2 to read data that is written to the disk 11 according to the first embodiment. More specifically, the magnetic disk drive 1 receives a read command from the host 2 to acquire information on a user-specified sector to which user data to be read is written. The magnetic disk drive 1 acquires a sector number of a destination to which the read user data is written from the obtained user-specified sectors and the correspondence indicated in the sector management table, acquires the read user data from the disk based on the sector number, and outputs the acquired read user data to the host.

The second embodiment described above provides a magnetic disk drive and a data control method in which a format for writing data to a magnetic disk is changed.

In the second embodiment, as shown in FIG. 1, the magnetic disk drive 1 including one head 16 and one disk 11 writes and reads data. However, a magnetic disk drive including a plurality of heads 16 and a plurality of disks 11 can also write and read data by the same process.

For example, a magnetic disk drive including multiple disks employing the method of the second embodiment writes data by following a change of data frame length each time the data frame length is changed with a head change, a zone change or the like, dividing or connecting user-specified sectors to match the changed data frame length, and changing the number of bits and the size of a write sector.

The magnetic disk drive including a multiple disks employing the method of the second embodiment reads data by following a change of data frame length each time the data frame length is changed with a head change, a zone change or the like, dividing or connecting user-specified sectors to match the changed data frame length, and changing the number of bits and the size of a read sector.

The magnetic disk drive including a multiple disks employing the method of the second embodiment receives, for example, a fifth command containing a write instruction to write fifth user data to change a first head to a second head while the fifth user data is being writing to a first disk by the first head in a third zone Zone[i] (i is the identification number of the zone). If there is a header in the fifth data frame of a fourth zone Zone[j] (j is the identification number of the zone) of a second disk corresponding to the second head, the magnetic disk drive writes at least part of the fifth user data to the fifth data frame. If there is no header in the fifth data frame, the magnetic disk drive writes at least part of the fifth user data with the header attached to the fifth data frame.

In a magnetic disk drive including multiple heads and multiple disks, if the amount of data that can be stored in a data frame (write sector of the disk 11) varies with a difference in BPI depending on, for example, different positions of the heads, there are consecutive sectors with no servos therebetween and split sectors at a high rate, which decreases format efficiency. According to the method of the second embodiment, data constructed by the format specified by the host 2 (including user-specified sectors) is converted into the format of data frames of the disk 11 and written to the disk 11. Even though the magnetic disk drive including multiple heads and multiple disks is used, the area on the medium can be used without waste since there is no consecutive sectors with no servos therebetween or format loss due to split sectors.

The magnetic disk drive 1 mentioned above may include one of the following features or any combination of two or more of the features:

(A-1) For example, as the data DT in FIG. 6(*c*) indicates, the magnetic disk drive 1 writes data by dividing (example of Data 2) or connecting (example of Data 2 and Data 3) data of user-specified sectors so that the sector size of the disk to which data is written during Band write is the data frame length, and thus including no heads to change the number of bits.

(A-2) For example, as shown in step S205 of FIG. 7, the magnetic disk drive 1 reads data based on the write sector size (data frame length) which is determined from information of a user-specified sector specified as the read command.

(A-3) The magnetic disk drive including multiple disks employing the method of above embodiment writes data by following a change of data frame length each time the data frame length is changed with a head change, a zone change or the like, dividing or connecting user-specified sectors to match the changed data frame length, and changing the number of bits and the size of a write sector.

(A-4) The magnetic disk drive including a multiple disks employing the method of above embodiment reads data by following a change of data frame length each time the data frame length is changed with a head change, a zone change or the like, dividing or connecting user-specified sectors to match the changed data frame length, and changing the number of bits and the size of a read sector.

(A-5) For example, as shown in step S210 of FIG. 7, the magnetic disk drive 1 reads data of up to the sector including data of the user-specified sector specified by the read command, extracts only necessary data (data with the header removed) and reports it to the host.

(A-6) The magnetic disk drive 1 changes the LBA defined by the user-specified block size to an address converted by the sector size in which the number of bits is changed by separating or connecting user-specified sectors to match the data frame length.

(A-7) The magnetic disk drive 1 stores, on a system area, an address converted from the LBA defined by the user-specified block size by the sector size in which the number of bits is changed by separating or connecting user-specified sectors to match the data frame length.

(A-8) The magnetic disk drive 1 manages an address converted, from the LBA defined by the user-specified block size, by the sector size in which the number of bits is changed by separating or connecting user-specified sectors to match the data frame length.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Processing steps in the flowcharts and sequence charts, and the like described in the aforementioned embodiments are within the scope of the invention even if steps are exchanged, deleted, or added without departing from the spirit and scope of the invention.

Processings indicated in the flowcharts, sequence charts, and the like may be realized by hardware such as CPU, IC chip, digital signal processor (Digital Signal Processor: DSP), software operable in a computer including a microcomputer (program, for example), or a combination of hardware and software.

Furthermore, claims written as a processing logic, as a program including instructions executing in a computer, or as a computer-readable recording medium with the instruction are encompassed within the scope of the invention. Furthermore, terms used in the above are not limited, and other expressions which are understandable as substantially the same are encompassed within the scope of the invention.

What is claimed is:

1. A magnetic disk drive of shingled magnetic recording (SMR), comprising:
a disk to which user data is written with a header attached thereto, for each data frame including a plurality of blocks, which is a data area in a track of the disk to which the user data is written; and
a controller configured to:
if a first data frame has free space to write user data when first user data is written to the first data frame by a first command, cause second user data to be written from a physical address subsequent to a last physical address of the first user data in the first data frame in response to a second command; and
when all of the second user data is not written to the first data frame,
if a writable second data frame has a header, cause a rest of the second user data to be written to a writable area of the second data frame, and
if the second data frame has no header, cause the rest of the second user data to be written to a writable area of the second data frame with a header attached thereto.

2. The magnetic disk drive of claim 1, wherein:
a plurality of bands, which is a group of tracks, are set on the disk;
when a third command including an instruction to write third user data is received, if all of the third user data is not written to a first band, a writable third data frame of a second band is selected;
if the third data frame has a header, at least part of the third user data is written to the third data frame; and
if the third data frame has no header, at least part of the third user data is written to the third data frame with a header attached thereto.

3. The magnetic disk drive of claim 1, wherein:
a plurality of zones, which is a group of bands, are set on the disk;
when a fourth command including an instruction to write fourth user data is received, if all of the fourth user data is not written to a first band, a writable fourth data frame of a second band is selected;
if the fourth data frame has a header, at least part of the fourth user data is written to the fourth data frame; and if the fourth data frame has no header, at least part of the fourth user data is written to the fourth data frame with a header attached thereto.

4. The magnetic disk drive of claim 1, comprising a plurality of heads and a plurality of disks corresponding to the heads, wherein:
when a fifth command including an instruction to write fifth user data is received and a first head is changed to a second head while the fifth user data is being written to a third zone of a first disk by a first head, if a fifth data frame of a fourth zone of a second disk corresponding to the second head has a header, at least part of the fifth user data is written to the fifth data frame, and if the fifth data frame has the header, at least part of the fifth user data is written to the fifth data frame with the header attached thereto.

5. The magnetic disk drive of claim 1, comprising:
a storage unit which stores a correspondence of i) an identification number of a data frame on the disk to which the user data is written and ii) an identification number of a user-specified sector indicated by a logical block address (LBA) of a first block to which the user data, which is included in a write command received from a host, is written, a number of blocks, and a block size.

6. The magnetic disk drive of claim 5, wherein the storage unit is located in a system area of the disk.

7. The magnetic disk drive of claim 5, wherein the controller is further configured to:
acquire information of a user-specified sector of read user data to be read from a read command received from the host;
acquire a sector number of a destination in which the read user data is stored from the user-specified sector and the correspondence;
acquire the read user data based on the sector number; and
output the read user data to the host.

8. A method of writing data to magnetic disk drive of shingled magnetic recording (SMR), wherein user data is written to a disk with a header attached thereto, for each data frame including a plurality of blocks, which is a data area in a track of the disk to which the user data is written, wherein if a first data frame has free space to write user data when first user data is written to the first data frame by a first command, writing second user data from a physical address subsequent to a last physical address of the first user data in the first data frame in response to a second command, and
when all of the second user data is not written to the first data frame,
if a writable second data frame has a header, writing a rest of the second user data to a writable area of the second data frame, and
if the second data frame has no header, writing the rest of the second user data to a writable area of the second data frame with a header attached thereto.

9. A magnetic disk drive of shingled magnetic recording (SMR), comprising:
a disk to which user data is written with a header attached thereto, for each data frame including a plurality of blocks, which is a data area in a track of the disk to which the user data is written; and
a storage unit which stores a correspondence of i) an identification number of a data frame on the disk to which the user data is written and ii) an identification number of a user-specified sector indicated by a logical block address (LBA) of a first block to which the user data, which is included in a write command received from a host, is written, a number of blocks, and a block size.

10. The magnetic disk drive of claim 9, wherein the storage unit is located in a system area of the disk.

11. The magnetic disk drive of claim 9, further comprising:
a controller configured to:
acquire information of a user-specified sector of read user data to be read from a read command received from the host;
acquire a sector number of a destination in which the read user data is stored from the user-specified sector and the correspondence;
acquire the read user data based on the sector number; and
output the read user data to the host.

* * * * *